US012688806B2

(12) United States Patent
Liu et al.

(10) Patent No.: US 12,688,806 B2
(45) Date of Patent: Jul. 21, 2026

(54) ELECTRONIC DEVICE

(71) Applicant: Innolux Corporation, Miaoli County (TW)

(72) Inventors: Ming-Chen Liu, Miaoli County (TW); Zi-Yang Zhang, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/608,936

(22) Filed: Mar. 19, 2024

(65) Prior Publication Data

US 2024/0355249 A1 Oct. 24, 2024

Related U.S. Application Data

(60) Provisional application No. 63/460,321, filed on Apr. 19, 2023.

(30) Foreign Application Priority Data

Jan. 23, 2024 (CN) ........................ 202410094259.0

(51) Int. Cl.
*G09G 3/00* (2006.01)

(52) U.S. Cl.
CPC ..... *G09G 3/006* (2013.01); *G09G 2310/0286* (2013.01); *G09G 2310/0291* (2013.01); *G09G 2330/12* (2013.01)

(58) Field of Classification Search
CPC ........... G09G 3/006; G09G 2310/0286; G09G 2310/0291; G09G 2330/12; G09G 3/20
See application file for complete search history.

(56) References Cited

U.S. PATENT DOCUMENTS 8,139,194 B2 * 3/2012 Yamamoto ........... G09G 3/3611 345/55
8,451,414 B2 * 5/2013 Nonaka .................... G09G 3/20 349/146

(Continued)

FOREIGN PATENT DOCUMENTS

CN 106328077 5/2019
CN 112927637 6/2021

(Continued)

OTHER PUBLICATIONS

Dictionary.com, "adjacent," in Dictionary.com Unabridged. Source location: Random House, Inc. http://dictionary.reference.com/browse/adjacent, Nov. 18, 2011, p. 1.*

*Primary Examiner* — Jeff Piziali
(74) *Attorney, Agent, or Firm* — JCIPRNET

(57) ABSTRACT

The disclosure provides an electronic device. The electronic device has a display area and a peripheral area. The peripheral area is adjacent to the display area. The peripheral area includes a first testing circuit area and a second testing circuit area. The first testing circuit area includes multiple first switching elements. The multiple first switching elements are arranged along a first direction. The second testing circuit area is adjacent to the first testing circuit area. The second testing circuit area includes multiple second switching elements. The multiple second switching elements are arranged along a second direction. The first direction is different from the second direction. The electronic device according to the disclosure can realize effective display area testing.

18 Claims, 8 Drawing Sheets

(56) References Cited

U.S. PATENT DOCUMENTS

| | | | | |
|---|---|---|---|---|
| 9,626,900 | B2 * | 4/2017 | Anzai | G09G 3/2096 |
| 10,134,825 | B2 * | 11/2018 | Shin | G09G 3/3233 |
| 10,157,565 | B2 * | 12/2018 | Shin | G02F 1/13454 |
| 10,268,253 | B2 * | 4/2019 | Liu | G06F 1/1652 |
| 10,770,014 | B2 * | 9/2020 | Yeh | G09G 3/3674 |
| 10,852,606 | B2 * | 12/2020 | Nie | G02F 1/13458 |
| 11,132,953 | B2 * | 9/2021 | Yamada | H10K 59/131 |
| 11,217,653 | B2 * | 1/2022 | Kwak | G09G 3/03 |
| 11,393,893 | B2 * | 7/2022 | Jo | G09G 3/3266 |
| 11,711,956 | B2 * | 7/2023 | Du | G02F 1/133<br>345/206 |
| 11,917,876 | B2 * | 2/2024 | Liu | G02B 27/01 |
| 12,069,932 | B2 * | 8/2024 | Hyeon | H10K 59/88 |
| 2008/0018557 | A1 * | 1/2008 | Maeda | G02F 1/167<br>345/55 |
| 2008/0266210 | A1 * | 10/2008 | Nonaka | G09G 3/20<br>345/55 |
| 2014/0253419 | A1 * | 9/2014 | Tanada | G09G 3/20<br>345/55 |
| 2016/0240141 | A1 * | 8/2016 | Lee | G09G 3/20 |
| 2016/0351098 | A1 * | 12/2016 | Lin | G02F 1/1345 |
| 2018/0075810 | A1 * | 3/2018 | Kim | G09G 3/3266 |
| 2019/0109184 | A1 * | 4/2019 | Li | G06F 1/163 |
| 2021/0027718 | A1 * | 1/2021 | Yokoyama | G09F 9/30 |
| 2021/0201730 | A1 * | 7/2021 | Gao | G09G 3/20 |
| 2022/0199039 | A1 * | 6/2022 | Lee | G09G 3/3291 |
| 2022/0208079 | A1 * | 6/2022 | Jo | G09G 3/32 |
| 2022/0208114 | A1 * | 6/2022 | Jo | G09G 3/3266 |
| 2022/0343843 | A1 * | 10/2022 | Du | G09G 3/3233 |
| 2023/0010792 | A1 * | 1/2023 | Heo | G11C 19/28 |
| 2023/0071094 | A1 * | 3/2023 | Son | H01L 27/1255 |

FOREIGN PATENT DOCUMENTS

| | | | | |
|---|---|---|---|---|
| CN | 113763848 | | 12/2021 | |
| WO | WO-2022056901 | A1 * | 3/2022 | G09G 3/006 |

* cited by examiner

ELECTRONIC DEVICE

CROSS-REFERENCE TO RELATED APPLICATION

This application claims the priority benefits of U.S. provisional application Ser. No. 63/460,321, filed on Apr. 19, 2023, and China application serial no. 202410094259.0, filed on Jan. 23, 2024. The entirety of each of the above-mentioned patent applications is hereby incorporated by reference herein and made a part of this specification.

BACKGROUND

Technical Field

The disclosure relates to a device, and particularly relates to an electronic device having a testing function.

Description of Related Art

In the manufacturing process of high-resolution products, since the layout space of the testing circuit of the high-resolution product may be limited by the peripheral area of the substrate, it is difficult to design the testing circuit to effectively test functional elements of the display area, which in turn leads to poor production yields of the high-resolution products.

SUMMARY

The disclosure is directed to an electronic device having a testing function.

According to an embodiment of the disclosure, the electronic device of the disclosure has a display area and a peripheral area. The peripheral area adjacent to the display area. The peripheral area includes a first testing circuit area and a second testing circuit area. The first testing circuit area includes multiple first switching elements. The multiple first switching elements are arranged along a first direction. The second testing circuit area is adjacent to the first testing circuit area and includes multiple second switching elements. The multiple second switching elements are arranged along a second direction. The first direction is different from the second direction.

In the electronic device according to the disclosure, multiple testing circuit areas can be disposed in the peripheral area to achieve effective testing functions for the display area.

In order to make the above-mentioned features and advantages of the disclosure more comprehensible, embodiments are specifically mentioned below and described in detail with the accompanying drawings.

DESCRIPTION OF THE EMBODIMENTS

Figure 1:
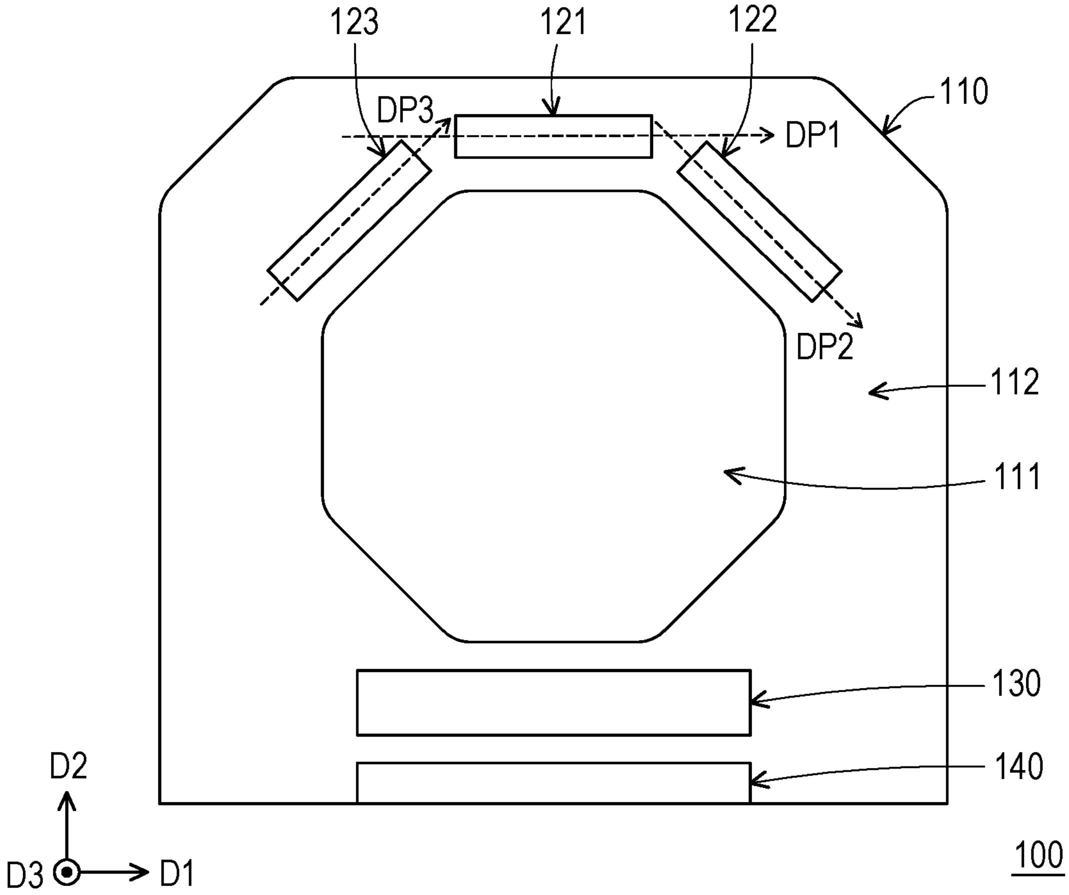
FIG. 1 is a schematic diagram of an electronic device according to an embodiment of the disclosure.

Reference will now be made in detail to exemplary embodiments of the disclosure, examples of which are illustrated in the accompanying drawings. Whenever possible, the same reference numerals are used in the drawings and descriptions to represent the same or similar parts.

Throughout the specification and appended claims of the disclosure, certain words are used to refer to specific elements. Persons skilled in the art should understand that electronic device manufacturers may refer to the same elements by different names. The document does not intend to distinguish the elements with the same function but different names. In the following specification and claims, the words "comprise" and "include" are open-ended words and thus should be interpreted as the meaning of "comprising but not limited to . . . "

Directional terms mentioned in the text, such as "upper," "lower," "front," "back," "left," and "right," merely refer to directions with reference to the accompanying drawings. Therefore, the directional terms used are used to illustrate, but not to limit the disclosure. In the drawings, each drawing illustrates the general features of the methods, structures, and/or materials used in specific embodiments. However, the drawings should not be interpreted as defining or limiting the scope or nature covered by the embodiments. For example, for the sake of clarity, the relative size, thickness, and position of each film layer, region, and/or structure may be reduced or enlarged.

In some embodiments of the disclosure, terms related to engagement and connection, such as "connect" and "interconnect", unless specifically defined, may mean that two structures are in direct contact, or that two structures are not in direct contact and another structure is disposed between the two structures. The terms related to engagement and connection may also include the case where two structures are movable or two structures are fixed. In addition, the term "electrical connection" includes any direct and indirect electrical connection means.

The ordinal numbers used in the specification and claims, such as "first", "second", and the like, are used to modify elements, but neither imply nor represent that the/the plurality of element(s) has/have any previous ordinal numbers, and represent neither the order of an element and another element nor the order of the manufacturing method. The ordinal numbers are merely used to clearly distinguish an element with a certain name from another element with the same name. It is possible that the same term is not used in the claims and the specification. Accordingly, the first element in the specification may be the second element in the claims. It should be understood that the following embodiments may replace, reorganize, and mix the technical features of several different embodiments to complete other embodiments without departing from the spirit of the disclosure.

In each embodiment of the disclosure, an electronic device includes a display device, a light emitting device, a backlight device, a wearable device (for example, including an augmented reality or virtual reality (VR) device), an antenna device, a sensing device, or a splicing device, but not limited thereto. The electronic device may be a bendable or a flexible electronic device. The display device may be a non-self-illuminating display device or a self-illuminating display device. The antenna device may be a liquid crystal type antenna device or a non-liquid crystal type antenna device, and the sensing device may be a sensing device that senses capacitance, light, heat, or ultrasonic waves, but is not limited thereto. The electronic device may include, for example, electronic elements such as passive elements and active elements, for example, capacitors, resistors, inductors, diodes, and transistors. The display panel of the display device may include, for example, liquid crystal, light emitting diode, quantum dot (QD), fluorescence, phosphor, other suitable materials, or a combination of the above materials, but is not limited thereto. The light emitting diode may include, for example, an organic light emitting diode (OLED), a sub-millimeter light emitting diode (mini LED), a micro LED, or a quantum dot light emitting diode (QLED or QDLED), fluorescence, phosphor, or other suitable materials, and the materials may be arranged and combined in any way, but are not limited thereto. The splicing device may be, for example, a display splicing device or an antenna splicing device, but is not limited thereto. It should be noted that the electronic device may be any arrangement or combination of the above-mentioned, but is not limited thereto. In addition, the shape of the electronic device may be a rectangle, a circle, a polygon, a shape with curved edges, or other suitable shapes. The electronic device may have peripheral systems such as drive systems, control systems, and light source systems to support display devices, antenna devices, wearable devices (for example, including augmented reality or virtual reality (VR) devices), vehicle-mounted devices (for example, including car windshields), or splicing devices.

In each embodiment according to the disclosure, a substrate may be a hard substrate or a flexible substrate. The material of the substrate may include, for example, metal, plastic, glass, quartz, sapphire, ceramics, carbon fiber, other suitable substrate materials, or a combination of the above, but the disclosure is not limited thereto.

FIG. 1 is a schematic diagram of an electronic device according to an embodiment of the disclosure. Referring to FIG. 1, an electronic device 100 includes a substrate 110, in which the substrate 110 has a display area 111 and a peripheral area 112. The surface of the substrate 110 extends along a direction D1 and a direction D2, and the display area 111 may provide a display light toward a direction D3. The direction D1, the direction D2, and the direction D3 are perpendicular to each other. In this embodiment, the display area 111 may include a pixel array, multiple data lines, and multiple gate lines. The pixel array may include multiple pixels, and each pixel may include multiple sub-pixels, in which the multiple sub-pixels may include, for example, red sub-pixels, green sub-pixels, and blue sub-pixels, but the disclosure is not limited thereto. In this embodiment, the peripheral area 112 includes a first testing circuit area 121, a second testing circuit area 122, a third testing circuit area 123, a fourth testing circuit area 130, and an external circuit area 140.

In this embodiment, an array testing circuit may be, for example, disposed in the first testing circuit area 121, the second testing circuit area 122, and the third testing circuit area 123 respectively. A light-on testing circuit may be, for example, disposed in the fourth testing circuit area 130. A flexible printed circuit (FPC) may be disposed in the external circuit area 140. In this embodiment, the display area 111 may be formed in an octagonal shape, but the disclosure is not limited thereto. In an embodiment, the display area 111 may be formed in a polygon shape, and each interior angle of the polygon is greater than 90 degrees. In another embodiment, the display area 111 may also be formed in a rectangular shape or in any shape.

In this embodiment, the first testing circuit area 121 is disposed adjacent to an upper side of the display area 111. The second testing circuit area 122 is disposed adjacent to a right oblique side of the display area 111. The third testing circuit area 123 is disposed adjacent to a left oblique side of the display area 111. The second testing circuit area 122 and the third testing circuit area 123 may be adjacent to the first testing circuit area 121 respectively. In this embodiment, the first testing circuit area 121 and the fourth testing circuit area 130 may be disposed on two sides of the display area 111 opposite to each other respectively. The fourth testing circuit area 130 is disposed adjacent to a lower side of the display area 111. The fourth testing circuit area 130 may be disposed between the display area 111 and the external circuit area 140.

Figure 2:
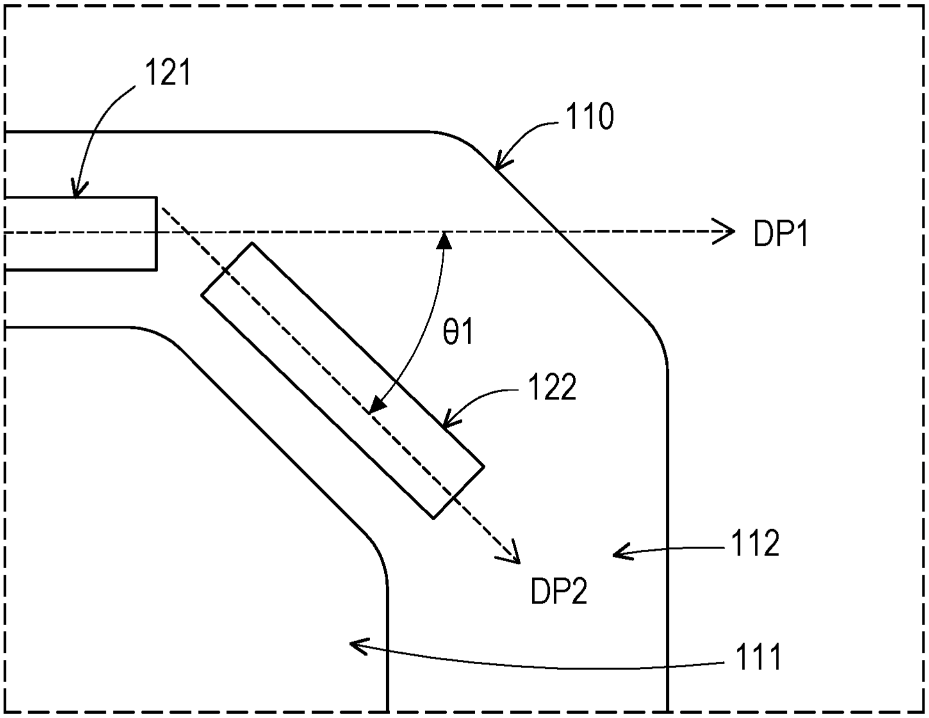
FIG. 2 is a schematic diagram of a partial area of the electronic device according to an embodiment of the disclosure.

FIG. 2 is a schematic diagram of a partial area of the electronic device according to an embodiment of the disclosure. Referring to FIG. 1 and FIG. 2, in this embodiment, the array testing circuit in the first testing circuit area 121 may include multiple first switching elements. The multiple first switching elements are arranged along a first direction DP1. The second testing circuit area 122 is adjacent to the first testing circuit area 121. The array testing circuit in the second testing circuit area 122 may include multiple second switching elements. The multiple second switching elements are arranged along a second direction DP2. The first direction DP1 is different from the second direction DP2. In this embodiment, a quantity of the first switching elements is greater than a quantity of the second switching elements.

In this embodiment, an included angle θ1 between the first direction DP1 and the second direction DP2 is an acute angle. Similarly, referring to FIG. 1, the third testing circuit area 123 is adjacent to the first testing circuit area 121. The array testing circuit in the third testing circuit area 123 may include multiple third switching elements. The multiple third switching elements are arranged along a third direction DP3. The third direction DP3 is different from the first direction DP1 and the second direction DP2. In this embodiment, an included angle between first direction DP1 and third direction DP3 may also be an acute angle. Moreover, in this embodiment, the included angle θ1 between the first direction DP1 and the second direction DP2 may also be the same as the included angle between the first direction DP1 and the third direction DP3, but the disclosure is not limited thereto.

Figure 3:
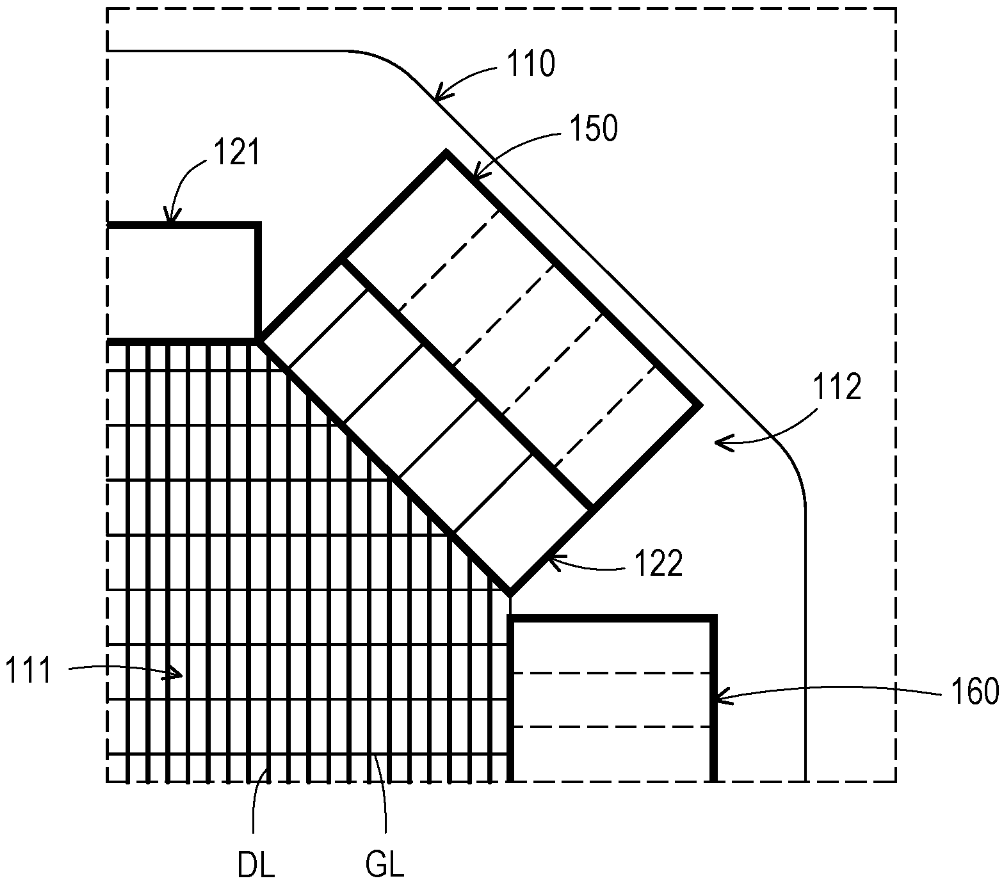
FIG. 3 is a schematic diagram of a partial area of an electronic device of another embodiment of the disclosure.

FIG. 3 is a schematic diagram of a partial area of an electronic device of another embodiment of the disclosure. Referring to FIG. 1 and FIG. 3, the electronic device 100 may further include a plurality of first gate drive circuits 150 and a plurality of second gate drive circuits 160. As shown in FIG. 3, the second testing circuit area 122 is disposed on the oblique side of the display area 111, and is disposed between the gate drive circuit 150 and the display area 111. The second gate drive circuit 160 may be disposed on a side of the display area 111. In this embodiment, the first gate drive circuit 150 and the second gate drive circuit 160 may include multiple gate drivers on panel (GOP) respectively.

In this embodiment, the display area 111 may include a pixel array and multiple gate drive lines GL and data lines DL. A portion of the multiple gate drive lines GL may be coupled to the first gate drive circuit 150 through the second testing circuit area 122. Another portion of the multiple gate drive lines GL may be coupled to the second gate drive circuit 160.

In addition, in an embodiment, the gate drive circuit 150 may also be disposed between the second testing circuit area 122 and the display area 111.

Figure 4:
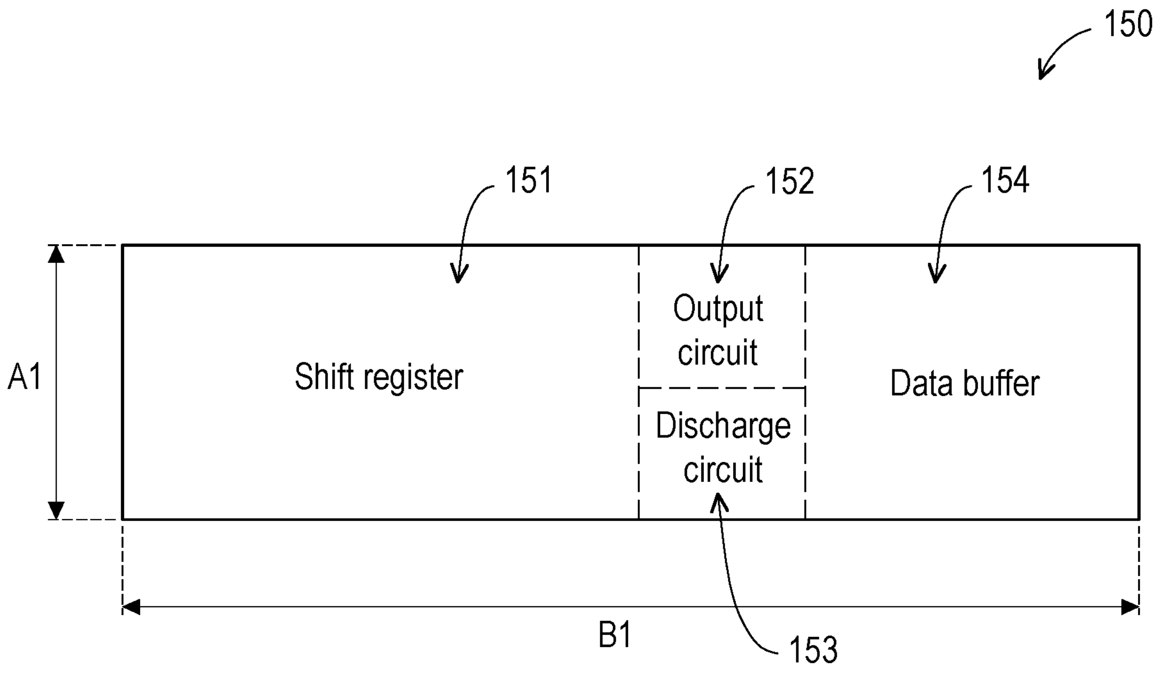
FIG. 4 is a schematic diagram of the first gate drive circuit according to an embodiment of the disclosure.

FIG. 4 is a schematic diagram of the first gate drive circuit according to an embodiment of the disclosure. Referring to FIG. 4, each of the first gate drive circuits 150 in FIG. 3 may have the structure of the first gate drive circuit 150 as shown in FIG. 4. In this embodiment, the first gate drive circuit 150 may at least include a shift register 151, an output circuit 152, a discharge circuit 153, and a data buffer 154. The shift register 151 may be coupled to the gate drive line GL in FIG. 3. The output circuit 152 and the discharge circuit 153 are disposed on a side of the shift register 151 respectively, and the output circuit 152 and the discharge circuit 153 are also disposed on a side of the data buffer 154 respectively. In this embodiment, a layout area of the first gate drive circuit 150 on the substrate 110 may have a width A1 and a length B1.

Figure 5:
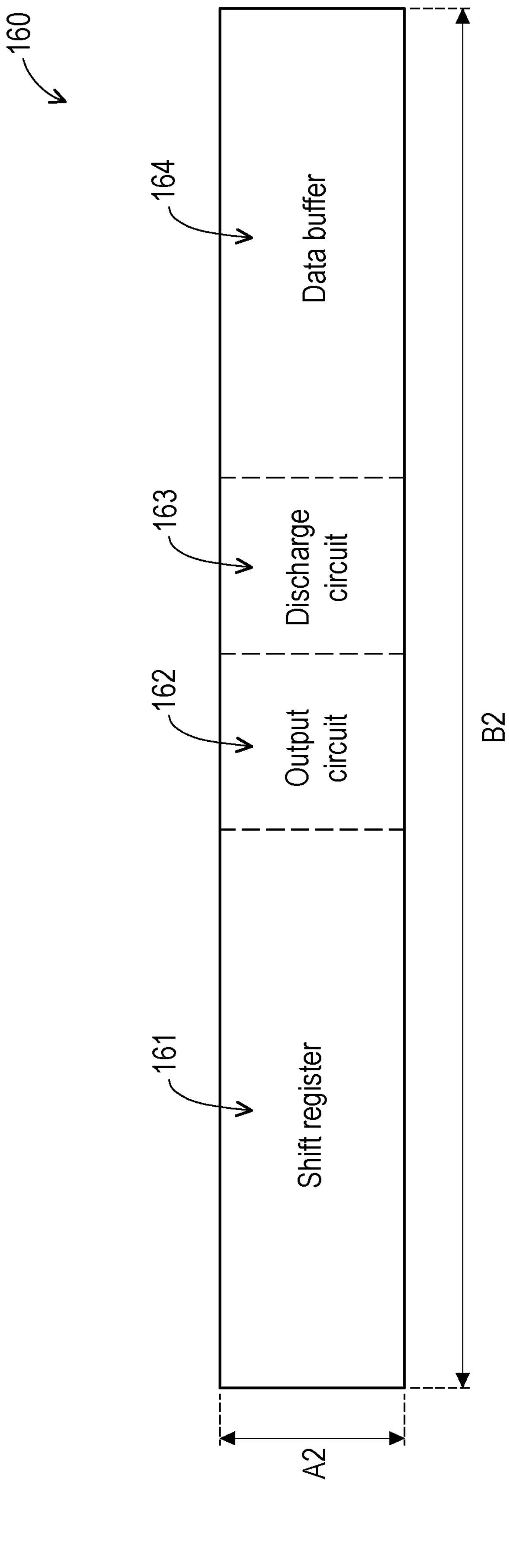
FIG. 5 is a schematic diagram of the second gate drive circuit according to an embodiment of the disclosure.

FIG. 5 is a schematic diagram of the second gate drive circuit according to an embodiment of the disclosure. Referring to FIG. 5, each of the second gate drive circuits 160 in FIG. 3 may have the structure of the second gate drive circuit 160 as shown in FIG. 5. In this embodiment, the second gate drive circuit 160 includes a shift register 161, an output circuit 162, a discharge circuit 163, and a data buffer 164. The shift register 161 may be coupled to the gate drive line GL in FIG. 3. The output circuit 162 is disposed on a side of the shift register 161 and disposed between the shift register 161 and the discharge circuit 163. The discharge circuit 163 is disposed on a side of the output circuit 162 and disposed between the output circuit 162 and the data buffer 164. In this embodiment, a layout area of the second gate drive circuit 160 on the substrate 110 may have a width A2 and a length B2.

Referring to FIG. 4 and FIG. 5, due to different disposition manners of the output circuit and the discharge circuit, the first gate drive circuit 150 and the second gate drive circuit 160 may have different layout area dimensions and/or sizes, but the disclosure is not limited thereto. For example, the width A1 may be greater than the width A2, and the length B2 may be greater than the length B1.

Figure 6:
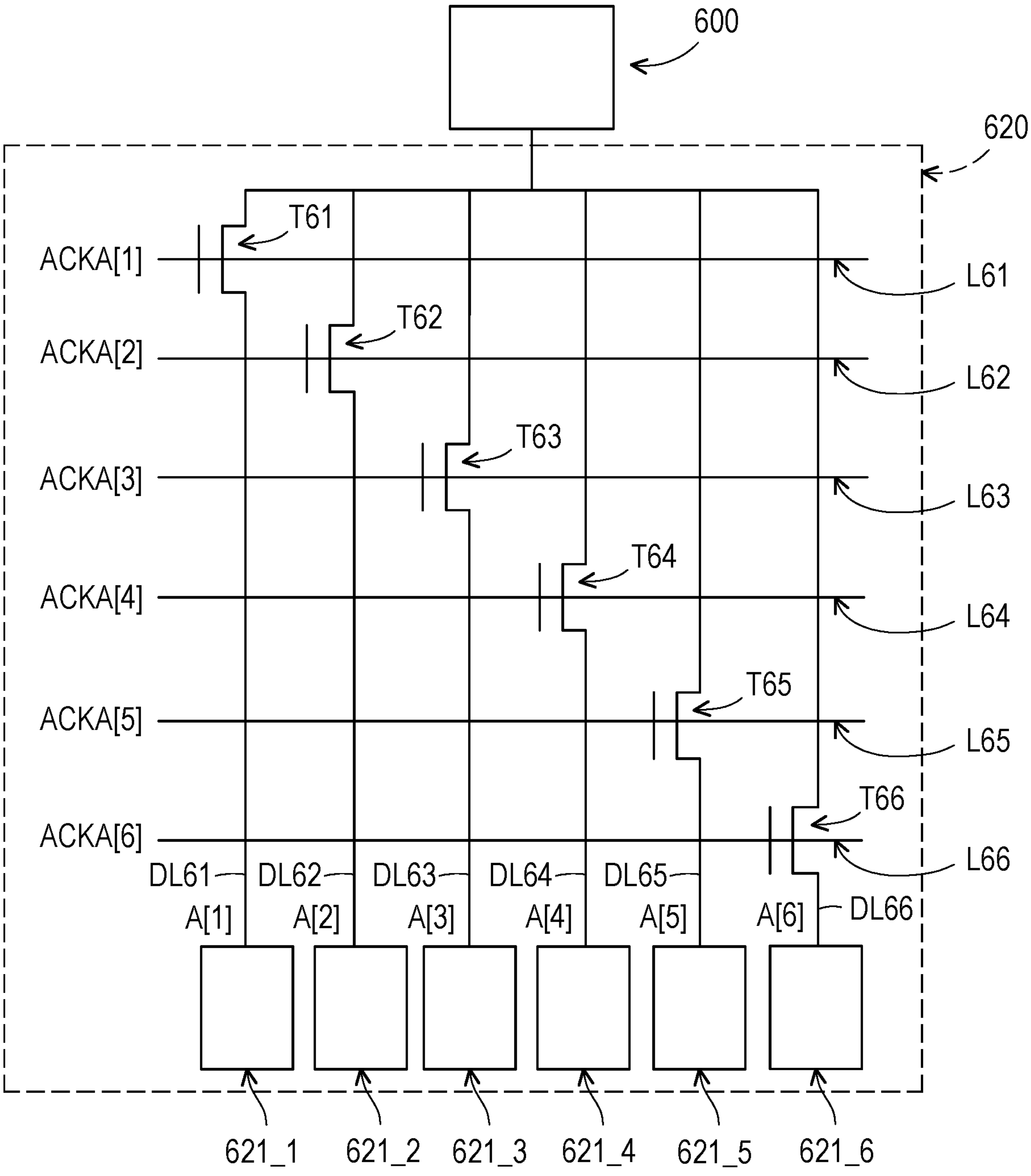
FIG. 6 is a schematic diagram of a first testing circuit in the first testing circuit area according to an embodiment of the disclosure.

FIG. 6 is a schematic diagram of a first testing circuit in the first testing circuit area according to an embodiment of the disclosure. Referring to FIG. 6, the first testing circuit area 121, the second testing circuit area 122, and the third testing circuit area 123 in FIG. 1 may have the circuit structure of a first testing circuit 620 as shown in FIG. 6 respectively. In this embodiment, the first testing circuit 620 includes multiple switches T61~T66, multiple control lines L61~L66, multiple data lines DL61~DL66, and multiple sub testing circuits 621_1~621_6. The control lines L61~L66 are coupled to control terminals of the switches T61~T66 respectively. First terminals of the switches T61~T66 are coupled to a testing signal source 600. Second terminals of the switches T61~T66 are coupled to the sub testing circuits 621_1~621_6 through the data lines DL61~DL66 respectively. The switches T61~T66 may be N-type thin film transistors (TFT) respectively, but the disclosure is not limited thereto.

In this embodiment, the control lines L61~L66 may receive control signals ACKA[1]~ACKA[6], so that the switches T61~T66 may decide whether the operation is to turn on or turn off based on the control signals ACKA[1]~ACKA[6]. In an embodiment, the switches T61~T66 may be turned on sequentially according to the control signals ACKA[1]~ACKA[6] to output testing signals A[1]~A[6] to the sub testing circuits 621_1~621_6 sequentially through the data lines DL61~DL66. It is worth noting that quantities of the switches, the control lines, the data lines, and the sub testing circuits in the first testing circuit according to the disclosure is not limited to as shown in FIG. 6.

Figure 7:
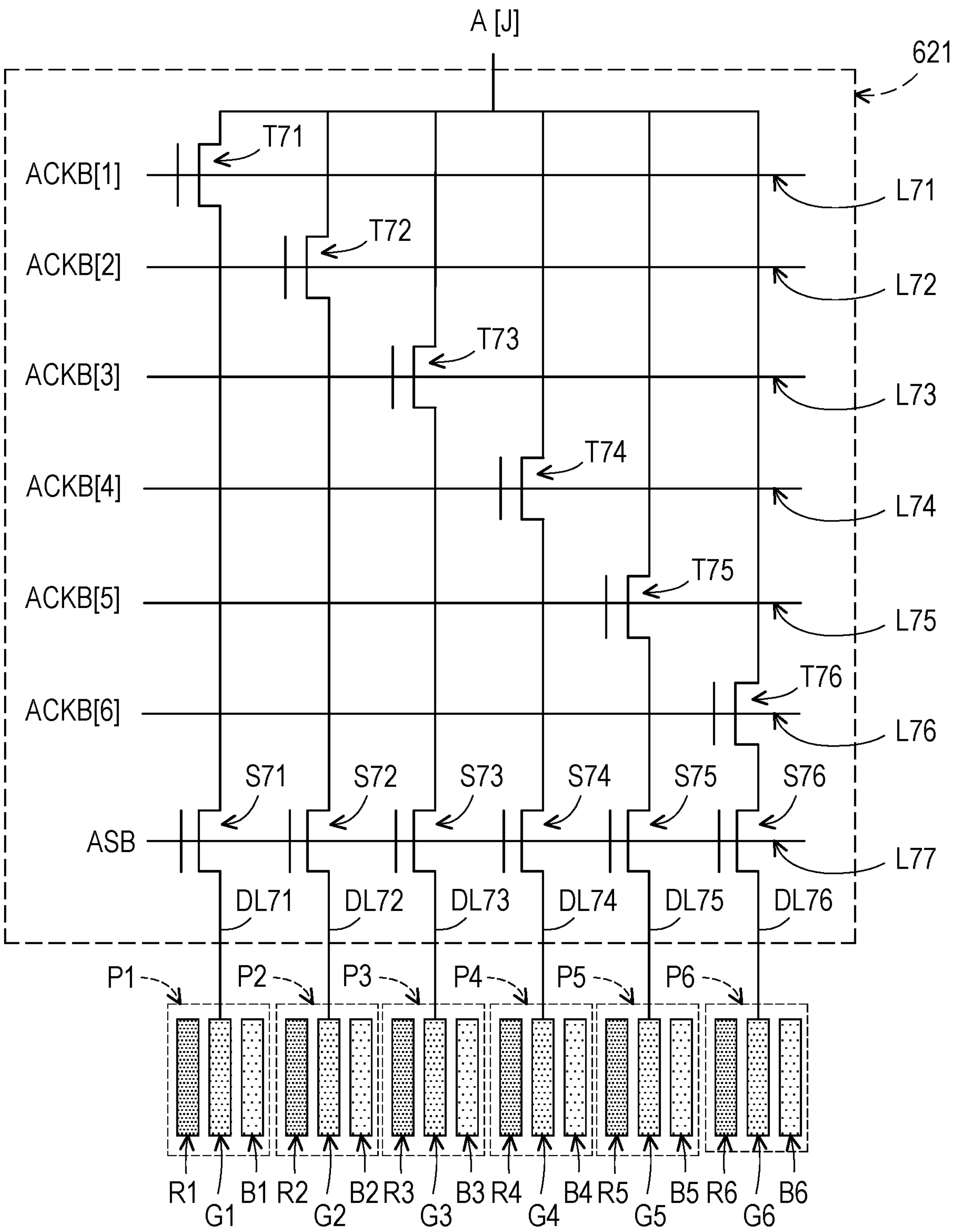
FIG. 7 is a schematic diagram of the sub testing circuit of the first testing circuit according to an embodiment of the disclosure.

FIG. 7 is a schematic diagram of the sub testing circuit of the first testing circuit according to an embodiment of the disclosure. Referring to FIG. 7, the sub testing circuits 621_1~621_6 in FIG. 6 may have the circuit structure of the sub testing circuit 621 shown in FIG. 7 respectively. In this embodiment, the sub testing circuit 621 includes switches T71~T76, multiple control lines L71~L77, multiple data lines DL71~DL76, and switches S71~S76. The control lines L71~L76 are coupled to control terminals of the switches T71~T76 respectively. First terminals of the switches T71~T76 are coupled to a testing signal A[J]. The testing signal A[J] may be one of the testing signals A[1]~A[6] in FIG. 6 (J may be 1 to 6). Second terminals of the switches T71~T76 are coupled to the first terminals of the switches S71~S76 respectively. The control line L77 is coupled to control terminals of the switches S71~S76. Second terminals of the switches S71~S76 are coupled to pixels P1~P6 respectively. The pixel array in the display area 111 shown in FIG. 1 may include the pixels P1~P6 shown in FIG. 6. The pixels P1~P6 include multiple red sub-pixels R1~R6, multiple green sub-pixels G1~G6, and multiple blue sub-pixels B1~B6 (a pixel includes a red sub-pixel, a green sub-pixel, and a blue sub-pixel). The switches T71~T76 and the switches S71~S76 may be N-type thin film transistors respectively, but the disclosure is not limited thereto.

In this embodiment, the switches S71~S76 may be coupled to the green sub-pixels G1~G6 in the pixels P1~P6 through the data lines DL71~DL76 respectively. In this embodiment, the control line L71~L76 may receive control signals ACKB[1]~ACKB[6], so that the switches T71~T76 may decide whether the operation is to turn on or turn off based on the control signals ACKB[1]~ACKB[6]. The control line L77 may receive a control signal ASB, so that the switches S71~S76 may be turned on or off synchronously according to the control signal ASB.

In this embodiment, the switches T71~T76 may be turned on sequentially according to the control signals ACKB[1]~ACKB[6], the switches S71~S76 are turned on according to the control signal ASB, and the data lines DL71~DL76 output the testing signal A[J] to the green sub-pixels G1~G6 in the pixels P1~P6 sequentially to test whether the green sub-pixels G1~G6 may be lit normally and related electrical properties. It is worth noting that the switches, the control lines, the data lines and the coupled pixels, and the sub-pixels in the sub testing circuit according to the disclosure are not limited to as shown in FIG. 7. In an embodiment, the data lines DL71~DL76 may also be coupled to the red sub-pixels R1~R6 and/or the blue sub-pixels B1~B6 in the pixels P1~P6 respectively to test the sub-pixels of different colors.

Figure 8:
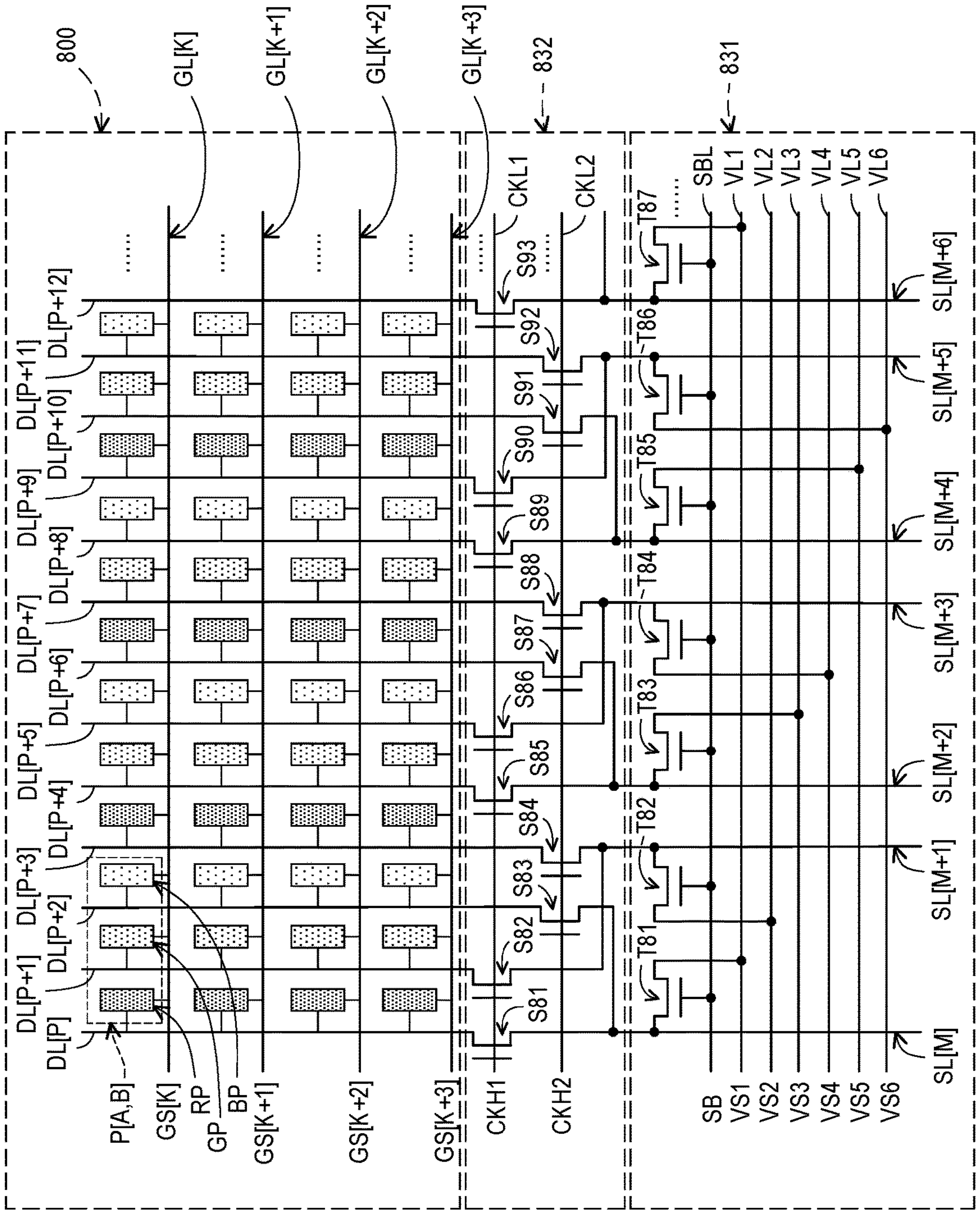
FIG. 8 is a schematic diagram of the second testing circuit of the fourth testing circuit area according to an embodiment of the disclosure.

FIG. 8 is a schematic diagram of the second testing circuit of the fourth testing circuit area according to an embodiment of the disclosure. Referring to FIG. 8, the fourth testing circuit area 130 in FIG. 1 may have a circuit structure of a light-on testing circuit 831 shown in FIG. 8. In this embodiment, a de-multiplexer (de-mux) circuit area 832 may also be included between the light-on testing circuit 831 and a pixel array 800. The pixel array in the display area 111 shown in FIG. 1 may include the pixel array 800 shown in FIG. 8. The pixel array 800 includes multiple pixels P[A,B], multiple data lines DL[P]~DP[P 12], and multiple gate drive lines GL[K]~GL[K 3], in which A, B, P, and K are positive integers respectively. Each of the pixels P[A,B] includes a red sub-pixel RP, a green sub-pixel GP, and a blue sub-pixel BP. The data lines DL[P]~DP[P 12] are coupled to multiple sub-pixels in different columns respectively, in which multiple sub-pixels in the same column are sub-pixels of the same color.

In this embodiment, the light-on testing circuit 831 includes multiple switches T81~T87, a control line SBL, multiple signal lines VL1~VL6, and multiple data lines SL[M]~SL[M+6], in which M is positive integer. The control line SBL is coupled to control terminals of the switches T81~T87. A first terminal of the switch T81 is coupled to the data line SL[M], and a second terminal of the switch T81 is coupled to the signal line VL1. A first terminal of the switch T82 is coupled to the data line SL[M+1], and a second terminal of the switch T82 is coupled to the signal line VL2. A first terminal of the switch T83 is coupled to the data line SL[M+2], and a second terminal of the switch T82 is coupled to the signal line VL3. A first terminal of the switch T84 is coupled to the data line SL[M+3], and a second terminal of the switch T84 is coupled to the signal line VL4. A first terminal of the switch T85 is coupled to the data line SL[M+4], and a second terminal of the switch T85 is coupled to the signal line VL5. A first terminal of the switch T86 is coupled to the data line SL[M+5], and a second terminal of the switch T86 is coupled to the signal line VL6. A first terminal of the switch T87 is coupled to the data line SL[M+6], and a second terminal of the switch T87 is coupled to the signal line VL1. By analogy, coupling manners of subsequent switches may be analogized by the coupling manner of the switches T81~T86. The switches T81~T87 may be N-type thin film transistors respectively, but the disclosure is not limited thereto.

In this embodiment, the demultiplexer circuit area 832 includes multiple switches S81~S93 and control lines CKL1 and CKL2. The switches S81~S93 and the control lines CKL1 and CKL2 may form a demultiplexer circuit. The control line CKL1 is coupled to control terminals of the switches S81, S82, S85, S86, S89, S90, and S93, and the control line CKL2 is coupled to control terminals of the switches S83, S84, S87, S88, S81, and S92. By analogy, coupling manners of subsequent switches and the control lines CKL1 and CKL2 may be analogized by the coupling manner of the switches S81~S93 and the control lines CKL1 and CKL2. The switches S81~S93 may be N-type thin film transistors respectively, but the disclosure is not limited thereto.

In this embodiment, the first terminal of the switch S81 is coupled to the data line DL[P], and the second terminal of the switch S81 is coupled to the data line SL[M]. The first terminal of the switch S82 is coupled to the data line DL[P+1], and the second terminal of the switch S82 is coupled to the data line SL[M+1]. The first terminal of the switch S83 is coupled to the data line DL[P+2], and the second terminal of the switch S83 is coupled to the data line SL[M]. The first terminal of the switch S84 is coupled to the data line DL[P+3], and the second terminal of the switch S84 is coupled to the data line SL[M+1]. The first terminal of the switch S85 is coupled to the data line DL[P+4], and the second terminal of the switch S85 is coupled to the data line SL[M+2]. The first terminal of the switch S86 is coupled to the data line DL[P+5], and the second terminal of the switch S86 is coupled to the data line SL[M+3]. The first terminal of the switch S87 is coupled to the data line DL[P+6], and the second terminal of the switch S87 is coupled to the data line SL[M+2]. The first terminal of the switch S88 is coupled to the data line DL[P+7], and the second terminal of the switch S88 is coupled to data line SL[M+3]. The first terminal of the switch S89 is coupled to the data line DL[P+8], and the second terminal of the switch S89 is coupled to the data line SL[M+4]. The first terminal of the switch S90 is coupled to the data line DL[P+9], and the second terminal of the switch S90 is coupled to the data line SL[M+5]. The first terminal of the switch S91 is coupled to the data line DL[P+10], and the second terminal of the switch S91 is coupled to the data line SL[M+4]. The first terminal of the switch S92 is coupled to the data line DL[P+11], and the second terminal of the switch S92 is coupled to the data line SL[M+5]. The first terminal of the switch S93 is coupled to the data line DL[P+12], and the second terminal of the switch S93 is coupled to the data line SL[M+6]. By analogy, subsequent coupling manners of the switches and the data lines may be analogized by the coupling manner of the switches S81~S93 and the data lines.

In this embodiment, the control line SBL may provide the control signal SB to the switches T81~T87. The signal lines VL1~VL6 may respectively provide the testing signals VS1~VS6 to the switches T81~T87. The control line CKL1 may provide a first timing control signal CKH1 to the control terminals of the switches S81, S82, S85, S86, S89, S90, and S93, and the control line CKL2 may provide a second timing control signal CKH2 to the control terminals of the switches S83, S84, S87, S88, S91, and S92. The gate drive lines GL[K]~GL[K+3] may provide gate drive signals GS[K]~GS[K+3] respectively to the multiple sub-pixels in the pixel array 800.

In this embodiment, the switches T81~T87 may receive the testing signals VS1~VS6 through the signal lines VL1~VL6, and the control signal SB turns on the switches T81~T87 synchronously, so that the switches S81~S93 may receive the testing signals VS1~VS6. The testing signals VS1~VS6 may have display testing data respectively. The switches S81~S93 may be turned on alternately according to the first timing control signal CKH1 and the second timing control signal CKH2 respectively, so as to alternately provide the testing signals VS1~VS6 to the sub-pixels in different columns in the pixel array 800 through the data lines DL[P]~DP[P+12]. Moreover, the gate drive lines GL[K]~GL[K+3] turn on the sub-pixels in different columns in the pixel array 800, and each sub-pixel in the pixel array 800 may be lit according to the corresponding testing signal.

In summary, in the electronic device according to the disclosure, multiple testing circuit areas may be disposed in the peripheral area adjacent to the display area. Also, array testing circuits and light-on testing circuits may be disposed. Moreover, the electronic device according to the disclosure may be applied to scenarios of display areas formed in any shapes.

Finally, it should be noted that the embodiments are merely used to illustrate the technical solution of the disclosure, rather than to limit the disclosure. Although the disclosure has been described in detail with reference to the embodiments, persons of ordinary skill in the art should understand that the persons may still modify the technical solutions described in the embodiments, or make equivalent substitutions for some or all of the technical features. However, the modifications or substitutions do not cause the essence of the corresponding technical solution to deviate from the scope of the technical solutions in embodiments of the disclosure.

What is claimed is:

1. An electronic device, having a display area and a peripheral area, wherein the peripheral area surrounds the display area, and the peripheral area comprises:

a first testing circuit area, comprising a plurality of first switching elements, wherein the plurality of first switching elements are arranged along a first direction;

a second testing circuit area, comprising a plurality of second switching elements, wherein the plurality of second switching elements are arranged along a second direction; and a gate drive circuit, comprising a shift register, wherein the first direction is different from the second direction, and the second testing circuit area is disposed between the display area and the shift register of the gate drive circuit, wherein the display area comprises a gate drive line, the gate drive line and the gate driver circuit are directly coupled to two opposite sides of the first testing circuit area or two opposite sides of the second testing circuit area.

2. The electronic device according to claim 1, wherein an included angle between the first direction and the second direction is an acute angle.

3. The electronic device according to claim 1, further comprising:

a third testing circuit area, wherein the third testing circuit area comprises a plurality of third switching elements arranged along a third direction, wherein the third direction is different from the first direction and the second direction.

4. The electronic device according to claim 3, wherein an included angle between the first direction and the third direction is an acute angle.

5. The electronic device according to claim 4, wherein the included angle between the first direction and the second direction is the same as the included angle between the first direction and the third direction.

6. The electronic device according to claim 1, wherein a plurality of gate drive circuits are disposed between the second testing circuit area and the display area.

7. The electronic device according to claim 1, wherein the peripheral area further comprises a fourth testing circuit area, and the first testing circuit area and the fourth testing circuit area are respectively disposed on two sides of the display area.

8. The electronic device according to claim 7, wherein the peripheral area further comprises an external circuit area, and the fourth testing circuit area is disposed between the display area and the external circuit area.

9. The electronic device according to claim 7, wherein the fourth testing circuit area comprises a light-on testing circuit.

10. The electronic device according to claim 1, wherein a quantity of the first switching elements is greater than a quantity of the second switching elements.

11. The electronic device according to claim 1, wherein the display area is formed in a polygon shape, and each internal angle of the polygon is greater than 90 degrees.

12. The electronic device according to claim 1, wherein the display area is formed in an octagonal shape.

13. The electronic device according to claim 1, wherein the peripheral area further comprises an output circuit, a discharge circuit, and a data buffer.

14. The electronic device according to claim 13, wherein the output circuit and the discharge circuit are disposed on a side of the shift register respectively, and the output circuit and the discharge circuit are also disposed on a side of the data buffer respectively.

15. The electronic device according to claim 13, wherein the output circuit is disposed on a side of the shift register, and disposed between the shift register and the discharge circuit, wherein the discharge circuit is disposed on a side of the output circuit, and disposed between the output circuit and the data buffer.

16. The electronic device according to claim 13, wherein the gate drive circuit comprises a plurality of gate drivers on a panel.

17. The electronic device according to claim 1, wherein the first testing circuit area comprises a plurality of sub testing circuits, and the plurality of sub testing circuits are coupled to sub-pixels of same color among a plurality of pixels respectively.

18. The electronic device according to claim 17, wherein the plurality of sub testing circuits are coupled to a plurality of green sub-pixels among the plurality of pixels respectively.

* * * * *